United States Patent [19]

Groepper

[11] 4,439,388

[45] Mar. 27, 1984

[54] PROCESS FOR CROSSLINKING OF POLYMERS AND COPOLYMERS USING FREE RADICAL FORMING AGENTS

[75] Inventor: Jurgen Groepper, Gunzburg, Fed. Rep. of Germany

[73] Assignee: Pennwalt Corporation, Philadelphia, Pa.

[21] Appl. No.: 405,019

[22] Filed: Aug. 3, 1982

[51] Int. Cl.$^3$ .................... B29H 21/04; B29C 25/00
[52] U.S. Cl. .................................. 264/130; 264/131; 264/236; 264/336; 264/340; 427/180; 427/372.2; 524/553; 524/554
[58] Field of Search ............... 264/129, 130, 131, 236, 264/336, 340, 347, 232; 427/180, 190, 372.2; 523/204; 524/405

[56] References Cited

U.S. PATENT DOCUMENTS

4,359,492  11/1982  Schlademan .................. 427/180

OTHER PUBLICATIONS

Chemical Abstracts 75(14) 89459a.

*Primary Examiner*—Jay H. Woo
*Assistant Examiner*—Tinker R. McBrayer

[57] ABSTRACT

Crosslinkable polymers and co-polymers are treated with boric acid, boric acid anhydride, or mixtures thereof prior to crosslinking with free radical organic peroxide initiators in the presence of oxygen. This pretreatment prevents stickiness of the surface of the crosslinked polymer making the crosslinked polymer more commercially acceptable.

2 Claims, No Drawings

PROCESS FOR CROSSLINKING OF POLYMERS AND COPOLYMERS USING FREE RADICAL FORMING AGENTS

BACKGROUND OF THE INVENTION

The present invention pertains to the pretreatment of crosslinkable polymers and copolymers with boric acid, boric acid anhydride, or mixtures thereof prior to crosslinking using free radical initiators in the presence of oxygen to form crosslinked polymers with non-sticky surfaces.

It is known from the technical literature that the crosslinking of copolymers, especially of thick and complicated profiles, may be carried out with sulfur using the UHF-hot air method or the shear head-hot air method. It is also known that crosslinking with free radical initiators, such as organic peroxides, in the presence of oxygen leads to incompletely crosslinked and sticky surfaces of the parts (see, for example, Farbenfabriken Bayer, Notice of Mar. 2, 1962, Levapren 450 (ethyl vinyl acetate), Section 7.1.1 to 7.1.5, and notice sheet of Dec. 1, 1965, Urepan (urethane rubber), p. 15, first section, and Chemische Werke Huls, May 1976, Third Edition, Buna AP (EPM/EPDM), insert section "Instructions for processors", p.4).

The stickiness especially occurs in the case of copolymers with high filler contents and extended with oil, such as ethylene-propylene copolymers (EPM), ethylene-propylene diene monomer copolymers (EPDM), styrene-butadiene rubber (SBR), acrylonitrile-butadiene rubber (NBR), natural rubber ((cis-1,4-polyisoprene) (NR), isoprene rubber (IR), ethylene-vinyl acetate copolymers (EVA), acrylonitrile-butadiene-styrene copolymers (ABS), styrene-isoprene-styrene copolymers (SIS), chloroprene rubber (CR), chlorinated polyethylene (DM) and polymethane rubber. In order to obtain the better quality of polymers crosslinked with free radical initiators, crosslinking was carried out with organic peroxide initiators in a molten salt bath, known as the "liquid curing method" (LCM), in a steam tube or in other closed systems. A further possibility is described in German Preliminiary Published Application No. 2,936,906, which describes the treatment of the surface with solutions of metal soaps, such as cobalt octoate, cerium octoate, iron octoate, etc.

SUMMARY OF INVENTION

Surprisingly it has now been found that the treatment of polymers and/or copolymers crosslinkable with free radical forming agents in the presence of oxygen after molding but prior to the crosslinking process using powdered boric acid or boric acid anhydride or mixtures thereof leads to hardened products which have non-adhesive, scratch-resistant and solvent-resistant surfaces.

Therefore the invention pertains to a process for the crosslinking of polymers and/or copolymers, which may contain the customary additives and fillers, with free radical forming agents in the presence of oxygen, which is characterized in that the polymers and/or copolymers are pretreated following shaping but before crosslinking to prevent surface stickiness with (a) powdered boric acid, (b) powdered boric acid anhydride and [or] (c) mixtures thereof.

DETAILED DESCRIPTION OF INVENTION

Free radical forming agents which may be considered include, for example, organic peroxide or azo compounds. The crosslinking may take place by heating by means of shear head and/or ultra-high frequencey irradiation (UHF) and/or hot air-/heating systems.

The powdered boric acid or boric acid anhydride or mixtures thereof are applied to the profiles, tubes or other parts using powdering equipment conventionally employed in the rubber industry, and the excess of the powder removed again. These powdering devices use dust nozzles to create a dust atmosphere, or contain a powder bath loosened up with gas or air, or rotating brushes by means of which the powder is applied to the profile surface. The excess not adhering to the surface is drawn off, blown off or brushed off, since otherwise it deposits unnecessarily in the UHF or hot air system. Powdered boric acid or boric acid anhydride is preferably applied to the molded parts by blowing, brushing or dusting on.

The powder is preferably applied in quantities of 200 mg/m$^2$ to 10,000 mg/m$^2$, particularly preferably 400 mg/m$^2$ to 2000 mg/m$^2$, on the surface of the molded article.

The powder should have maximal particle size of 90 $\mu$m, preferably of less than or equal to 20 $\mu$m, in order to prevent excessively large boric acid or boric acid anhydride particles from becoming pressed into the surface, which is still thermoplastic, and damaging the surface.

All polymers and copolymers crosslinkable with suitable free radical sources, filled or unfilled, can be treated in accordance with the invention using the above-mentioned boron compounds in order to obtain non-sticky surfaces. Particularly stuitable for this treatment in order to avoid sticky surfaces after hardening are polymers and copolymers on the basis of $\alpha$-olefins. Examples of copolymers, which may be highly filled and extended with oils, if desired, include the following:

| | |
|---|---|
| EPM | ethylene-propylene copolymer |
| EPDM | ethylene-propylene-diene monomer copolymers (suitable diene monomers include, for example, ethylene norbornene, cyclopentadiene, butadiene, etc.) |
| SBR | styrene-butadiene rubber |
| EVA | ethylene-vinyl acetate copolymer |
| NBR | nitrile-butadiene rubber |
| NR | natural rubber |
| IR | isoprene rubber |
| ABS | acrylonitrile-butadiene rubber |
| SBS | styrene-butadiene-sytrene rubber |
| SIS | styrene-isoprene-styrene copolymer |
| CR | chloroprene rubber |
| CM | homopolymeric chlorinated polyethylene |
| AU | polyurethane rubber (polyester type) and polymethane rubber. |

The mixtures are generally composed of polymers and/or copolymers with various customary additives, such as reinforcing agents and fillers, e.g., carbon black, metal oxides, clays, carbonates, silicates, pigment, as well as free radical forming agents, activators, coagents, antioxidants, stabilizers, plasticizers, auxiliary oils or oils and/or extender oils.

The free radical forming agents, such as the customary organic peroxides, azo compounds and C—C initiators, are added in quantities of 0.1 to 15 wt-%, based on the finished mixture, usually from 1 to 10 wt-%.

Coagents, such as triallylcyanurate, triallylphosphate, ethylene glycol dimethacrylate, trimethylolpropane trimethacrylate, divinylbenzene, diallymaleate, etc., may be present in quantities from 0 to 5 wt-%, based on the finished mixture, generally from 0.5 to 3 wt-%.

The process in accordance with this invention makes it possible to avoid the formation of sticky surfaces in the peroxide crosslinking of polymers and/or copolymers in air.

EXAMPLES

The rubber mixtures described in the following examples were produced on a roller frame and rolled out into pieces 4 mm thick. Samples, 20×80 mm in size, were punched out of this. Some of these samples were left untreated and others were powdered by dipping in powdered boric acid (particle size 10 to 80 μm) or powdered boric acid anhydride (particle size 5 to 75 μm); they were heated in a heating oven at 180° to 230° C. for 10 min in the presence of air oxygen. The applied quantity of boric acid or boric acid anhydride on the molded pieces fluctuated between 400 and 750 mg/m². (Ten minutes of heating were sufficient to attain 99% conversion of the peroxide for crosslinking). The crosslinked samples while hot were pressed onto a paper under constant pressure and time conditions. After removing the samples from the paper, a more or less thick, black, sticky impression remained behind. The samples treated with the compounds in accordance with this invention left no impression or a less intensive impression than the untreated samples.

In addition the abrasion was tested with a spatula, and the solubility of the surface with trichloroethylene. (See corresponding tables in the examples).

Example 1

A highly surface-sticky mixture with a Shore hardness of 40 was produced from 100 parts EPDM (containing a diene monomer of the ethylidene norbornene type) with a Mooney plasticity NL 1+4 (100° C.) of 65, 90 parts HAF carbon black, 60 parts of a high boiling hydrocarbon oil, and 4 parts of dicumyl peroxide (98%).

The crosslinked samples, some of which had been dusted and some left untreated, displayed the characteristics presented in the following table:

| Treatment | Stickiness | Abrasion | Solubility |
| --- | --- | --- | --- |
| untreated | +++ | +++ | +++ |
| dusted with boric acid | --- | --- | --- |
| boric acid anhydride | --- | --- | --+ |
| zinc borate | -++ | +++ | +++ |
| borax | -++ | +++ | +++ |
| zinc stearate | +++ | +++ | +++ |

Explanation:
--- = none
--+ = slight
-++ = extensive
+++ = very extensive

Boric acid and boric acid anhydride functioned surprisingly well, while the zinc compounds used did not.

Example 2

A black profile mixture based on EPDM with dicyclopentadiene as the diene monomer and Shore hardness of 60, containing 2.6% of 1,1-di-tert.-butylperoxy-3,3,5-tri- methylcyclohexane (40%) and 2.45% dicumyl peroxide (40%) was crosslinked in the manner described, partially after dusting with boron compounds and partially without treatment, and its properties investigated.

| Treatment | Stickiness | Abrasion | Solubility |
| --- | --- | --- | --- |
| untreated | +++ | +++ | +++ |
| dusted with boric acid | --- | --- | --- |
| boric acid anhydride | --- | --- | --- |
| borax | -++ | +++ | +++ |
| zinc borate | +++ | +++ | +++ |

For explanation of symbols see Example 1

Example 3

An EPM Mixture without diene monomer with the following composition was treated as described in Examples 1 and 2, and gave the following results:

100 parts EPM, 90 parts HAF black, 20 parts oil, 8 parts dicumyl peroxide (40%), and 2 parts stearic acid.

| Treatment | Stickiness | Abrasion | Solubility |
| --- | --- | --- | --- |
| untreated | -++ | +++ | +++ |
| dusted with boric acid | --+ | --+ | -++ |
| boric acid anhydride | --+ | -++ | -++ |
| borax | +++ | +++ | +++ |

For explanation of symbols see Example 1.

Example 4

The same mixture as in Example 3, but with addition of 2.5 parts triallylcyanurate as coagent.

| Treatment | Stickiness | Abrasion | Solubility |
| --- | --- | --- | --- |
| untreated | -++ | +++ | +++ |
| dusted with boric acid | --- | --- | --+ |
| boric acid anhydride | --- | --- | --+ |

Example 5

Mixture on SBR basis with the following composition: 100 parts SBR (1502), 90 parts HAF black, 60 parts oil, 2 parts stearic acid, and 8 parts dicumyl peroxide (40%).

| Treatment | Stickiness | Abrasion | Solubility |
| --- | --- | --- | --- |
| untreated | +++ | +++ | +++ |
| dusted with boric acid | --- | --- | --- |
| boric acid anhydride | --- | --- | --- |

Example 6

Mixture on EVA basis with 60% vinyl acetate with the following composition: 100 parts EVA, 50 parts HAF carbon black, 20 parts oil, 1 part stearic acid, 2 parts dicumyl peroxide (40%) preparation, and 2 parts triallyl cyanurate.

| Treatment | Stickiness | Abrasion | Solubility |
|---|---|---|---|
| untreated | −++ | +++ | +++ |
| dusted with boric acid | − − − | − − − | − − − |
| boric acid anhydride | − − − | − − − | − − − |

What is claimed:

1. A process for the crosslinking of crosslinkable polymers or copolymers comprising molding the crosslinkable polymers or copolymers into the desired shaped articles, pretreating the shaped articles in order to prevent the surfaces from being sticky by coating on the shaped articles a member selected from the group consisting of boric acid, boric acid anhydride, and mixtures thereof, and crosslinking the coated shaped articles with free radical initators of organic peroxides in the presence of oxygen wherein the crosslinked shaped articles have non-sticky surfaces.

2. The process of claim 1 wherein the boric acid, boric acid anhydride and mixtures thereof are blown, painted, or dusted onto the molded articles as a powder.

* * * * *

UNITED STATES PATENT AND TRADEMARK OFFICE
CERTIFICATE OF CORRECTION

PATENT NO. : 4,439,388
DATED : March 27, 1984
INVENTOR(S) : Jurgen Groepper

It is certified that error appears in the above—identified patent and that said Letters Patent is hereby corrected as shown below:

In column 1, on the cover page, item "[73]" now reads in part "Pennwalt Corporation, Philadelphia, Pa." but should read --Luperox GmbH, Gunzburg/Donau, West Germany--

Signed and Sealed this

Third Day of September 1985

[SEAL]

Attest:

DONALD J. QUIGG

Attesting Officer   Acting Commissioner of Patents and Trademarks - Designate